Aug. 11, 1959  J. M. N. HANLET  2,899,372
METHOD OF MANUFACTURING PHOTOCONDUCTIVE
AND RECTIFYING ELEMENTS
Filed Dec. 28, 1956

INVENTOR
JACQUES M. N. HANLET

BY Ralph B. Stewart

ATTORNEY

United States Patent Office 2,899,372
Patented Aug. 11, 1959

2,899,372

METHOD OF MANUFACTURING PHOTOCONDUCTIVE AND RECTIFYING ELEMENTS

Jacques Marie Noël Hanlet, Paris, France, assignor to Centre d'Etudes et de Developpements de l'Electronique, CEDEL, Paris, France Application December 28, 1956, Serial No. 631,225

Claims priority, application France December 30, 1955

6 Claims. (Cl. 204—192)

The present invention relates to improvements in the method of manufacturing unidirectionally conducting elements, specially of the solid state kind such as photoconducting cells and so-called "dry" rectifiers. Such elements are constituted by a layer of semi-conducting material applied onto a conducting base plate and coated with a conducting counter-electrode at least partially covering the surface of the said semi-conducting layer.

More specifically, the invention relates to the method of manufacturing such photoconductive devices which employ a semi-conducting crystalline layer of a material belonging to the group composed of cadmium, lead, thallium and antimony sulfides, and also method of manufacturing solid state rectifiers wherein the semi-conducting layer comprises copper sulfide or oxide.

According to the invention, the method of manufacturing such elements as herein above defined essentially comprises the step of transferring through a process of cathodic projection the metallic particles extracted from a pure metallic layer onto a conducting base plate and simultaneously converting the same into the required compound by a suitable conditioning of the gas atmosphere wherein the said cathodic projection is effected; this method being further characterized in that a heat treatment is at least partially applied to the said base plate and consequently to the layer of semi-conductor deposited thereupon during this same step of transfer and conversion, so that a progressive conversion of the said layer into a monocrystalline layer of semi-conductor is ensured.

Preferably further, the metallic material in the initiating layer is obtained from the application of a selective evaporation process to crude metallic material, heated in vacuo, upon an intermediary base plate (herein after called the transfer base plate) consisting of a material uncombinable with the said pure metallic material in the conditions of operations throughout the said manufacturing steps.

In the attached drawing Figure 1 illustrates a unidirectional conducting element of the present invention wherein 1 is the conducting base plate, 2 the semi-conducting layer and 3 the counter-electrode of the manufactured product.

The method of manufacturing elements as herein above defined according to the invention may be described as follows:

All the manufacturing steps will be performed within a single vessel provided with such means as are necessary for variedly conditioning the inner atmosphere thereof, as by controlling its contents the pressure and/or temperature.

In the first place, an intermediary transfer base plate is arranged within the said vessel and, in close proximity thereof are placed, according to an isotropic arrangement, crucibles containing the crude material to be evaporated and which will form the metallic component of the semi-conducting layer of the final element, viz. either cadmium or lead or thallium or antimony, or else copper, as indicated above. A simple isotropic arrangement is for instance obtained by placing four crucibles in front of or opposite the four quadrant portions of a rectangular transfer base plate. The material of the said base plate may be magnesium, or otherwise, aluminium. The vessel is then evacuated to about $10^{-4}$ millimeters of Hg for instance and the crucibles are heated for obtaining the selective thermic evaporation of the contents of the said crucibles. The time length of this first step is determined on the one hand by the temperature to which the said crucibles are heated and on the other hand, by the thickness required for the metallic layer onto the transfer base plate. The temperature will be so chosen that only the pure metal is evaporated, whereby any impurity which might poison the semi-conductor is avoided from such an operation. The temperatures of evaporation in vacuum of the various materials herein concerned are well known per se and also their speed of evaporation. The evaporated material will obviously condense upon the "cool" plate constituted by the said transfer base plate.

Figure 1:
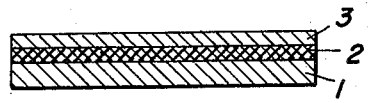
Figure 2:
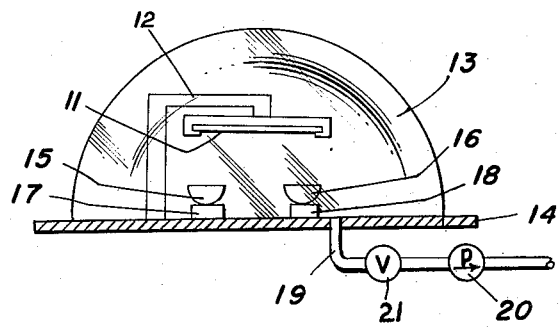
Figure 2 is a cross-sectional view of the apparatus useful in carrying out a step in the method of the present invention.

In order to more clearly understand the step set forth in the foregoing, attention is directed to Figure 2 which diagrammatically illustrates apparatus useful in carrying out the step of manufacturing the transfer base plate. The transfer base plate 11 is positioned on a suitable holder 12 in a vessel or bell jar 13. The bell jar 13 rests on a plate 14 which is able to make a gas tight seal with the edge of the bell jar. Suitable crucibles 15 and 16 are seen to be positioned at the corners of the transfer base plate. Each of the crucibles 15 and 16 are set on heating means 17 and 18 which may be of the inductive type. The plate 14 has an opening from conduit 19 which is connected to a vacuum pump 20. A valve 21 is provided so that when the desired vacuum is achieved the valve may be closed and the pump shut off.

Once the required layer of pure metal has been obtained, the crucibles are taken out of the vessel and a suitable base plate for the final product is arranged parallel to the metal layer and in close proximity thereto. The material of the said base plate may be iron, aluminium or an aluminium alloy, or else again magnesium when a sulfide semi-conductor is to be obtained thereupon. It may consist of copper when an oxide of copper is due to constitute the said semi-conducting layer.

A gas is then introduced within the said vessel. It will be $H_2S$ for the manufacturing of the elements comprising a sulfide semi-conductor, or it will be oxygen for the elements comprising an oxide semi-conductor. The pressure of the inner atmosphere is adjusted to about $10^{-1}$ or $10^{-2}$ millimetres of Hg for instance. A D.C. potential difference is then applied between the transfer base plate and the base plate proper so that an ionic current of about one hundred milliamperes of density for each square decimetre of the facing surfaces of the said plates is created, so that the metal layer upon the transfer base plate acts as a cathode of an ionic discharge device. The ions of the gas atmosphere impact upon the said cathode and extract therefrom metal particles which, once free, are attracted towards the base plate acting as an anode. The said base plate is progressively coated with a layer of the said particles but each one of the said particles has been converted into a corresponding particle of sulfide (or oxide as the case may be). Such a conversion occurs at the latest at the instant of extraction of the particle from the metal layer. The above cited density of ionic current is not critical; for the previously mentioned components, the transfer rates are the following ones: cadimium, 32 milligrams per ampere-hour; lead, 400 milligrams per ampere-hour; antimony, 900 milligrams per ampere-hour; thallium, 1050 miligrams per ampere-hour; and copper, 300 milligrams per ampere-hour.

Obviously the length in time of this manufacturing step will determine the thickness of the resulting semi-conducting layer. Further the transferred particles will all be identical and consequently this thickness will be accurately preserved at each point of the semi-conducting layer. The homogeneity thereof is also due to the first step for obtaining the metal layer to be transferred at least partially to the base plate during this second step of manufacturing.

During the said transfer operation, the base plate is heated to the temperature of crystallisation of the semi-conducting material deposited thereon, preferably through high frequency heating in order to avoid any disturbing thermal inertia. The crystalline arrangement of the semi-conductor will then be quite homogeneous and, in most cases, a monocrystal of semi-conductor will be obtained from this heat treatment.

Figure 3:
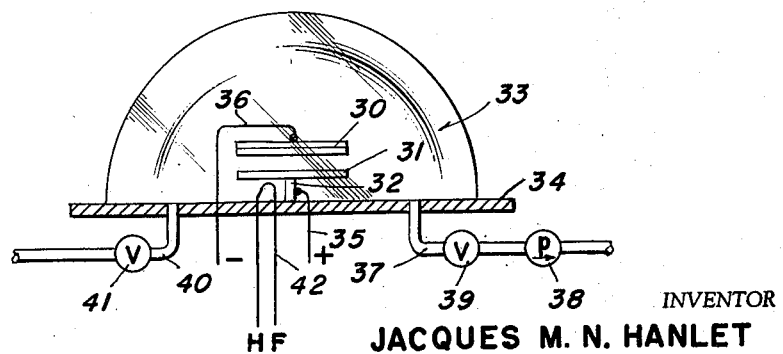
Figure 3 is a cross-sectional view of apparatus useful in carrying out another step in the method of the present invention.

Figure 3 illustrates diagrammatically apparatus useful in carrying out the step of establishing cathodic projection between the transfer base plate and the base plate. In connection therewith, the transfer base plate 30 is suitably positioned over the base plate 31 which is mounted on holder 32. The plates are enclosed in a vessel or bell jar 33 on a plate 34 which is capable of making a gas tight seal with the bell jar. Conductor leads 36 and 35 are attached to transfer base plate 30 and base plate 31, respectively. The plate 34 has conduit 37 opening into it. The conduit 37 leads to a vacuum pump 38 and valve 39. Another conduit 40 opens into the apparatus. This conduit is used to admit either of the gases oxygen or hydrogen sulfide when desired. A valve 41 seals off the conduit. A high frequency heating device 42 is located in the vessel so that the base plate may be heated.

The results obtained by the use of the above described manufacturing method are independant of the surfaces of the semi-conducting layers which may be as wide as the cross-section of the vessel within which they are established, if required. Of course a wide surface may be first made for cutting it thereafter into smaller parts.

Once the semi-conducting layer is obtained as described above, the vessel may be evacuated from the gas and a process of evaporation under vacuo of a conducting pellicular layer may be ensured for the formation on the surface of the said semi-conductor, of a metallic translucent film, for instance of aluminium or silver, for the photoconductive elements, of silver for the copper sulfide elements, and of indium for the copper oxide elements. For solid state rectifiers, this counter-electrode does not need to be translucent at all and the film may thus be replaced by a thicker coating.

From the foregoing it will be seen that in a specific example of a photo-conductive device, base plate 1 will be formed of magnesium, the semi-conductive layer 2 will be cadmium sulfide, and the transparent layer 3 will be formed of silver. During the formation of the layer 2, the transfer base plate will be formed of magnesium, and the cathodic projection operation is accomplished in a gaseous atmosphere of hydrogen sulfide.

In a specific example of a rectifier device of the sulfide type, base plate 1 will be magnesium, the layer 2 will be copper sulfide, and the layer 3 will be silver. The operation for producing the layer 2 is the same in this case as in the example given for the photo-conductive device.

In a specific example of a rectifier device of the oxide type, base plate 1 will be of copper, layer 2 will be of copper oxide, and layer 3 will be indium. In the formation of the layer 2, the transfer plate may be of magnesium, and the cathodic projection operation will be accomplished by the use of oxygen.

While three specific examples are described immediately above, it will be understood that other examples are included within the general description of the invention as given above.

Instead of a semi-conductor layer comprising a single metallic component, semi-conducting layers including a complex of sulfides of several metallic components may be easily obtained from the invention, as the metallic layer formed upon the transfer base plate may consist of a suitable alloy of these metal components, and further the ratio of the said components within the said alloy may be easily determined from the thermic evaporation step herein above described. The said ratio will in turn determine the ratio in the finally obtained semi-conducting layer according to the relative rates of transfer of the components of the alloy under the specified conditions. If, for instance, copper sulfide rectifiers are made, it is well known that it is preferred to introduce an activator sulfide in the semi-conducting layer in addition to the copper sulfide. Such an activator will be easily and obviously introduced in the copper sulfide layer by the above provisions, the activating element being introduced in further crucibles the apertures of which are suitably dimensioned with respect to the apertures of the crucibles containing the copper so that, for a single temperature of evaporation, the required ratio of copper and metallic activator is obtained in the alloy coating of the said intermediary transfer base plate.

What is claimed is:

1. A method of manufacturing photoconductive and rectifying elements of the metal sulfide and oxide kinds, which comprises the steps of preparing upon an intermediary transfer base plate a layer of the metallic component of the required semi-conductor, progressively transferring through a cathodic projection process the particles of part at least of the said metal layer onto a conducting base plate within an atmosphere selected from the group consisting of hydrogen sulfide and oxygen, heating the said base plate during the said transfer step, up to a temperature ensuring the crystallisation of the product deposited thereupon, and subsequently depositing a conductive coating, over part at least of the semi-conductor layer of the said product upon the said base plate.

2. A method of manufacturing photoconductive and rectifying elements according to claim 1 and wherein the step of preparing the said metallic layer includes the selective thermal evaporation under vacuo of crude material containing the said metallic component, from crucibles arranged according to an isotropic pattern with respect to the surface of the said transfer base plate.

3. A method according to claim 1 and wherein the said conductive coating is made from a process of evaporation under vacuo of a metal selected from the group consisting of silver and aluminum and is made as a translucent film thereupon.

4. A method of manufacturing according to claim 1 and wherein the material of the said transfer base plate is a metal selected from the group consisting of magnesium and aluminium.

5. The method of of making unidirectional conducting elements of the type in which a base plate carries a layer of a semi-conducting metallic composition, said method consisting of the steps of mounting said base plate with one face thereof arranged parallel to and in close proximity to a second plate extending over the same area as said base plate, the surface of said second plate facing said base plate being formed of a metallic substance from which said semi-conducting composition is to be formed, introducing between said plates a gas which when combined with said metallic substance will form said semi-conducting composition, maintaining said gas at a pressure of about $10^{-2}$ millimeters of mercury, and establishing cathodic projection between said plates with said second plate acting as a cathode whereby particles of said metallic substance are transferred from said second plate to said base plate and are deposited on said base plate as a semi-conducting composition, and subjecting said base plate to heat during cathodic projection to crystallize the semi-conductor layer.

6. A method according to claim 5 wherein said base plate is formed of metal selected from the group consisting of iron, aluminum and magnesium, the surface of said second plate facing said base plate being formed of a photoconductive material selected from the group consisting of antimony, cadmium, lead, and thallium, and said gas selected from a group consisting of hydrogen sulfide and oxygen.

References Cited in the file of this patent

UNITED STATES PATENTS

| | | |
|---|---|---|
| 1,900,018 | Lilienfield | Mar. 7, 1933 |
| 2,020,305 | Essig | Nov. 12, 1935 |
| 2,066,081 | Teves | Dec. 29, 1936 |
| 2,073,522 | Kingdon et al. | Mar. 9, 1937 |
| 2,112,975 | Penning et al. | Apr. 5, 1938 |
| 2,163,393 | Brunke et al. | June 20, 1939 |
| 2,189,580 | Hewlett | Feb. 6, 1940 |

FOREIGN PATENTS

| | | |
|---|---|---|
| 1,080,951 | France | June 2, 1954 |
| 757,782 | Great Britain | Sept. 26, 1956 |

OTHER REFERENCES

J. of the Optical Society, March 1833, vol. 23, pp. 109–113 (article by Overbeck).